United States Patent [19]

Gaines

[11] 4,287,877

[45] Sep. 8, 1981

[54] SOLAR AND CENTRAL FIREPLACE HEATING SYSTEM

[76] Inventor: Cecil A. Gaines, Rte. 1, Box 120 G, Fort Walton Beach, Fla. 32548

[21] Appl. No.: 101,147

[22] Filed: Dec. 7, 1979

Related U.S. Application Data

[63] Continuation-in-part of Ser. No. 947,350, Oct. 10, 1978, abandoned.

[51] Int. Cl.³ .............................. F24J 3/02; F28B 7/00
[52] U.S. Cl. .................................... 126/427; 126/121; 126/429; 237/51
[58] Field of Search ............... 126/427, 428, 429, 417, 126/437, 121, 143, 165; 237/51

[56] References Cited

U.S. PATENT DOCUMENTS

| | | | |
|---|---|---|---|
| 1,867,740 | 7/1932 | Guy | 126/121 |
| 2,322,016 | 6/1943 | Hardeman | 126/121 |
| 3,880,141 | 4/1975 | Abshear | 126/121 |
| 4,006,729 | 2/1977 | Cesa | 126/121 |
| 4,049,194 | 9/1977 | Tice et al. | 126/437 |
| 4,128,124 | 12/1978 | Worthington | 126/428 |
| 4,172,442 | 10/1979 | Boblitz | 126/437 |
| 4,206,744 | 6/1980 | Mahoney et al. | 126/121 |
| 4,210,125 | 7/1980 | Fender | 126/437 |
| 4,214,570 | 7/1980 | Hansmeyer | 126/121 |
| 4,215,673 | 8/1980 | Cohen | 126/429 |

Primary Examiner—Daniel J. O'Connor
Attorney, Agent, or Firm—Jones, Thomas & Askew

[57] ABSTRACT

A solar heating system for supplying heated air to various portions of a building. A solar panel is mounted externally of the building. The solar panel includes a solar radiation absorbing plate and a solar radiation transmissive plate spaced from the absorbing plate to define a solar air heating chamber. Ducts leading from the building circulate air through the solar air heating chamber. The heated air is then distributed throughout the building. The heat extraction unit of a fireplace can also be connected to the distributing duct work. Both the solar panel and the heat extraction unit additionally can be used to heat water.

4 Claims, 8 Drawing Figures

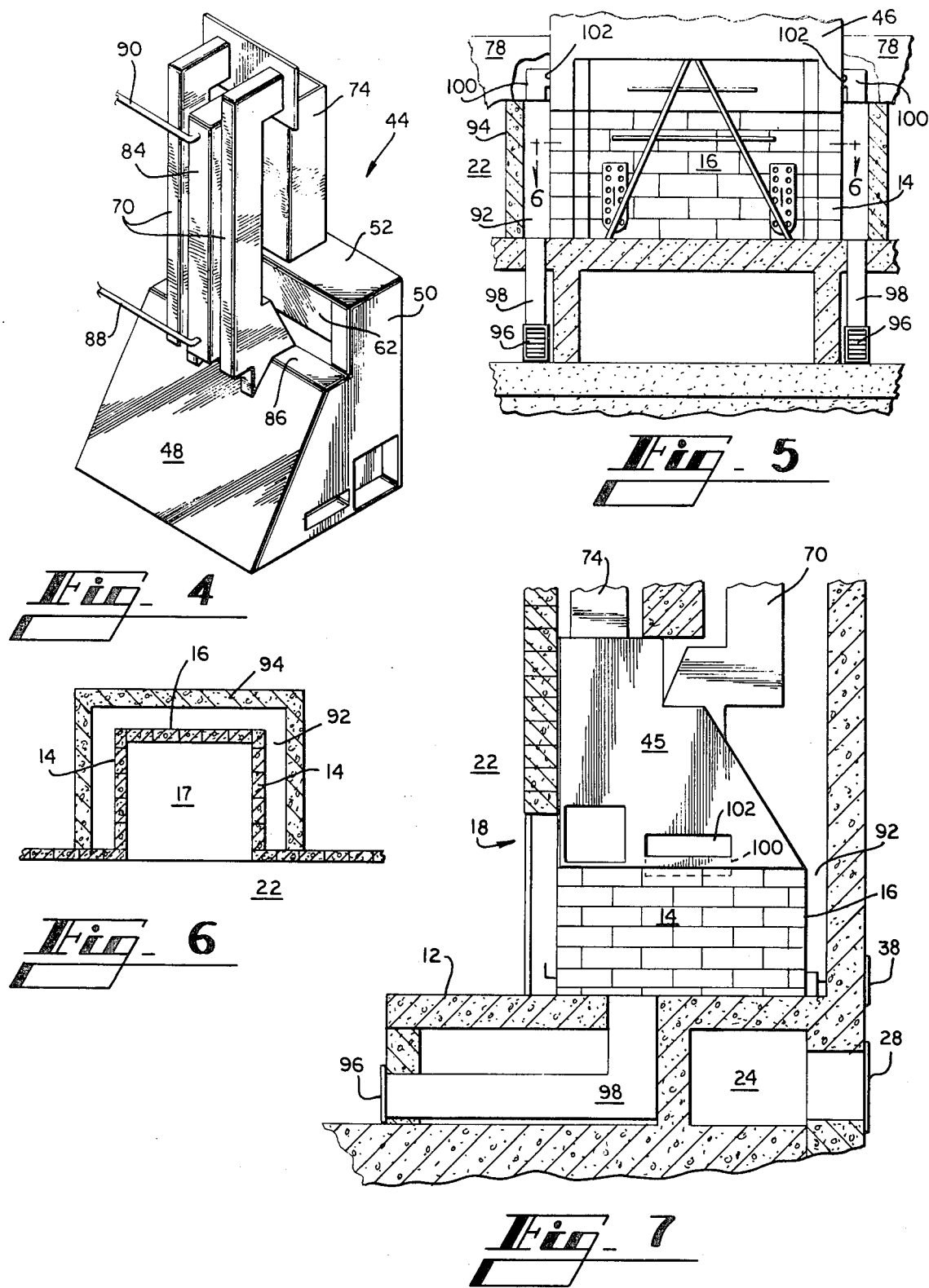

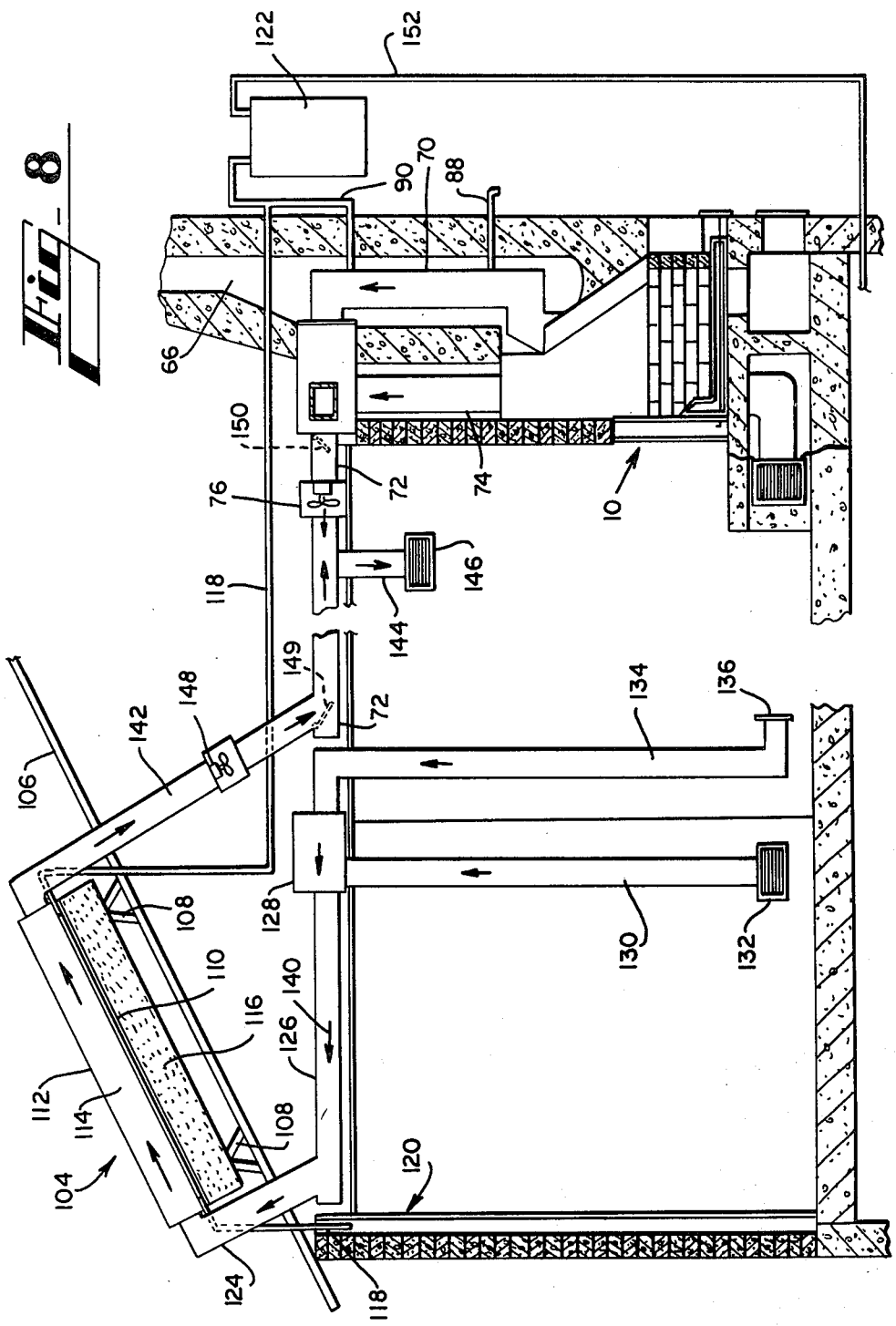

SOLAR AND CENTRAL FIREPLACE HEATING SYSTEM

CROSS REFERENCE TO RELATED APPLICATIONS

This application is a continuation-in-part of application Ser. No. 947,350 filed Oct. 10, 1978, now abandoned.

TECHNICAL FIELD

The present invention relates to heating systems and particularly to heating systems which utilize non-fossil fuel sources of energy; specifically solar energy and/or fuel burnable in a fireplace.

BACKGROUND OF THE INVENTION

With the rising price and increasing shortages of fossil fuels, there has been an increasing interest in the use of alternative fuel sources for heating houses and buildings. One of these alternative sources is firewood burned in a fireplace that has been modified to extract the heat from the burning wood and distribute that heat throughout the building in a more efficient manner than conventional fireplaces.

It is known that in a conventional fireplace the majority of the heat produced by the burning of the wood therein goes up the chimney and is lost. Previous attempts have been made to extract heat from the hot combustion gases before they escape from the chimney. Until now none of the previously known systems have been very successful.

Another alternative source of energy is so called solar power. Various types of solar panels are known in the art. However, heretofore a heating system utilizing a solar panel for efficiently and directly heating the air in a building, such as a residential home, has not been known.

BRIEF DESCRIPTION OF THE INVENTION

The present invention relates generally to a solar heating system for supplying heated air to various portions of a building. The heating system includes a solar panel mounted externally of the building to be heated. The solar panel includes a solar radiation absorbing plate and a solar radiation transmissive plate spaced from each other to define a solar air heating chamber. Ductwork between the building and the solar panel allows circulation of air through the solar air heating chamber. Additional ductwork distributes the heated air from the solar panel throughout the building.

In an alternate embodiment, the distributing ductwork is connected to a fireplace which utilizes the hot combustion gases produced in the burning of fuel therein to heat air in heating chambers within the fireplace. The fireplace provides a plurality of distinct heating chambers which communicate freely with one another and also a plurality of distinct heating areas for heating the air flowing through the ducts and heating chambers. The ducts and heating chambers are designed so that the air flowing therethrough spends a relatively long time in contact with the heated metal surfaces of the ducts and heating chambers. The heating chambers and ducts also provide a large amount of surface area which is exposed to the hot combustion gases to facilitate heat exchange therewith. In this manner the air forced through the heating system will be heated to a great extent, thereby using the heat provided by the burning of fuel in the fireplace more efficiently than with conventional fireplaces.

In an additional embodiment, both the solar panel and the fireplace are used to heat water. Water from a pressurized source is piped through the solar panel. The piping contacts the absorbing plate in heat transfer relation to heat the water flowing therethrough. The heated water is then piped to a storage tank.

Accordingly, it is an object of the present invention to provide an improved hot air heating system.

It is another object of the present invention to provide a heating system utilizing a solar panel and a fireplace with a plurality of heating chambers.

It is a further object of the present invention to provide a heating system which utilizes alternate energy sources.

Yet another object of the present invention is to provide a heating system which heats both air and water.

These and other objects, features and advantages of the present invention will become apparent from a review of the following detailed description of the disclosed embodiment and the appended drawing and claims.

BRIEF DESCRIPTION OF THE DRAWING

FIG. 4 is a detailed view of an alternative embodiment of the heat extraction unit shown in FIG. 3.

FIG. 5 is a detailed front view of an alternate disclosed embodiment of the fireplace shown in FIG. 1.

FIG. 6 is a cross-sectional view taken along the line 6—6 of the fireplace shown in FIG. 5. FIG. 7 is a side view of the fireplace shown in FIG. 5.

FIG. 8 is a schematic view of a disclosed embodiment of the solar heating system of the present invention.

DETAILED DESCRIPTION OF THE DISCLOSED EMBODIMENT

Figure 1:
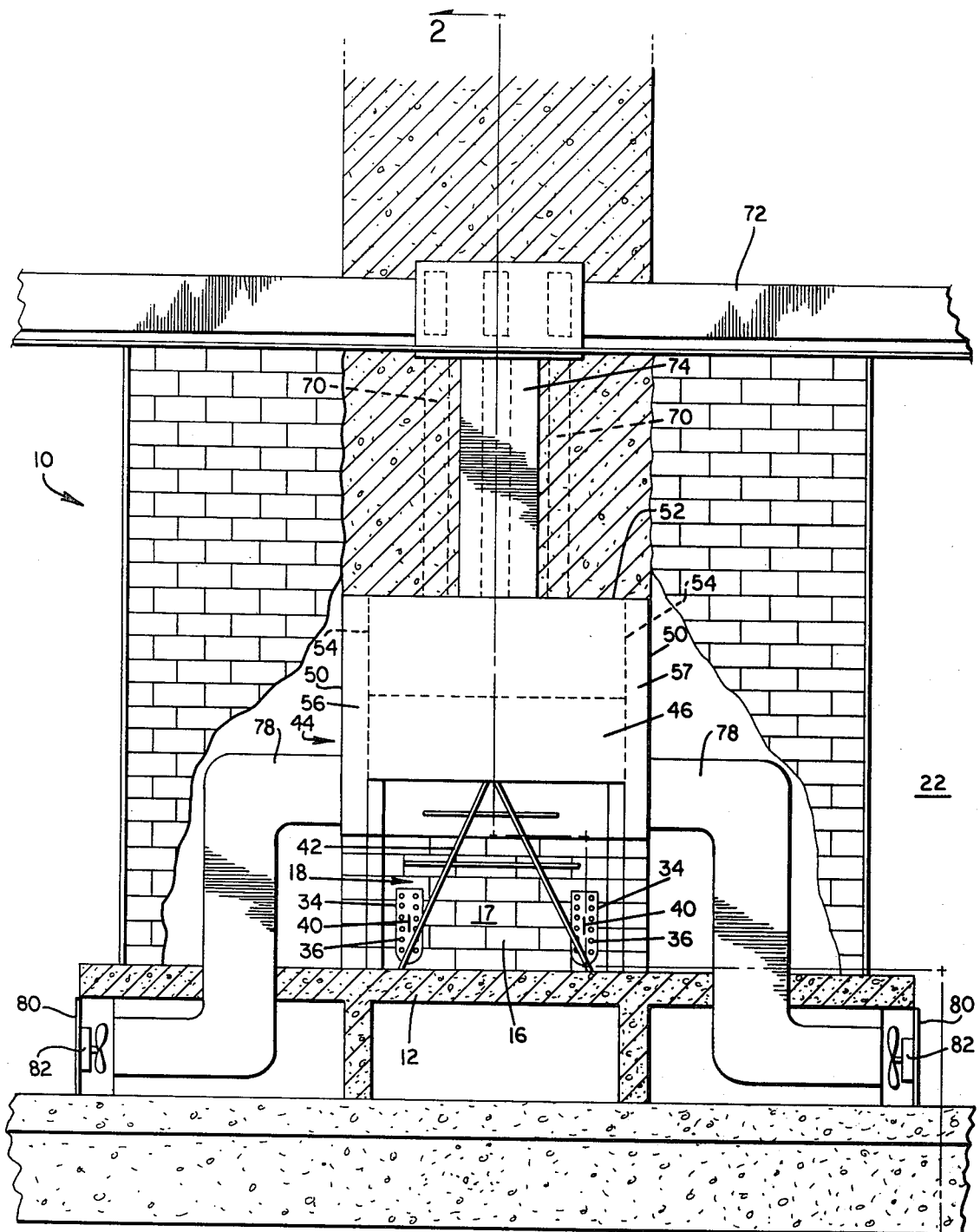
FIG. 1 is a front plan view, shown in partial cut away, of a disclosed embodiment of the central fireplace heating system of the present invention.
Figure 2:
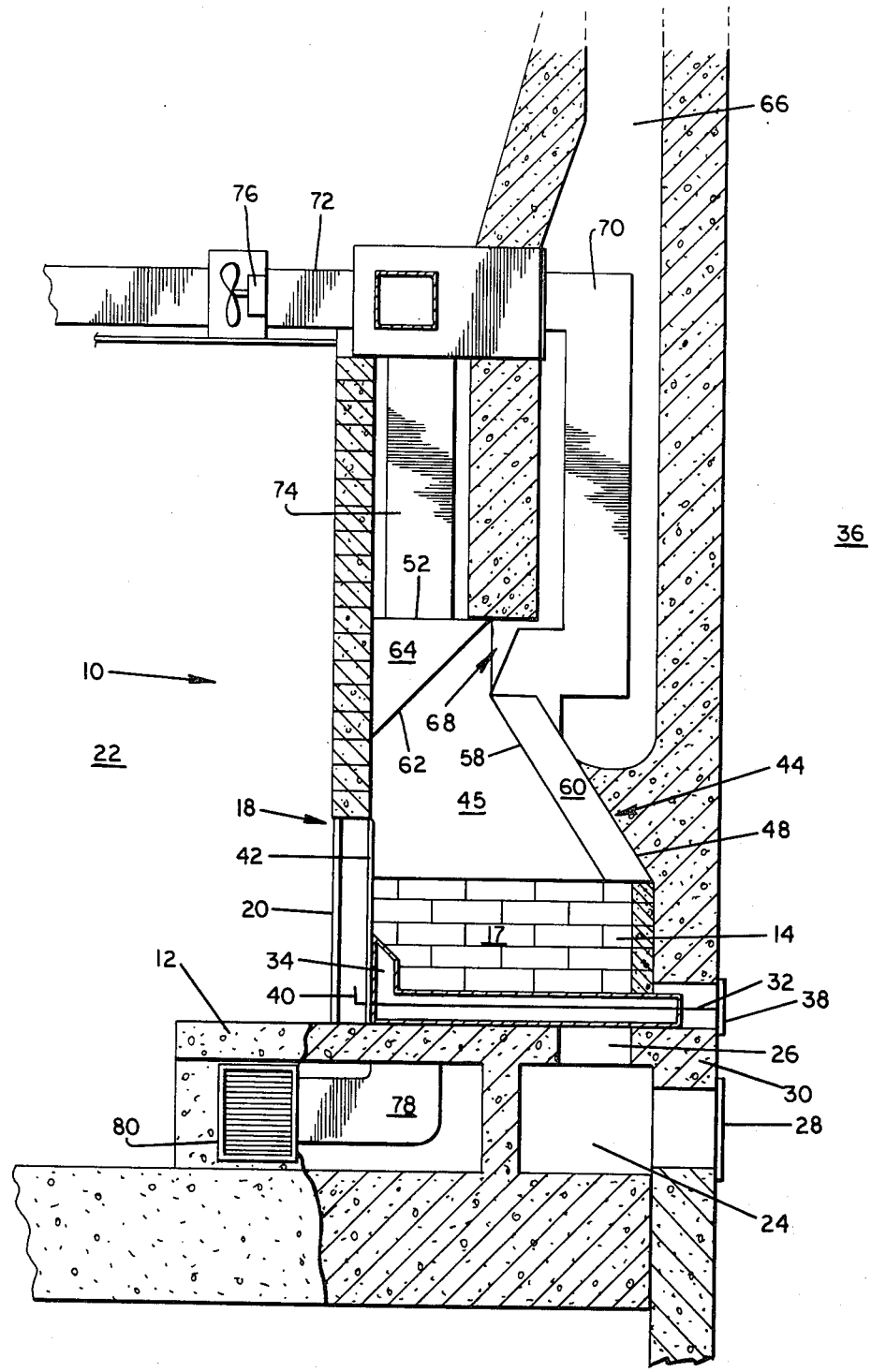
FIG. 2 is a cross-sectional view taken along the line 2—2 in FIG. 1.
Figure 3:
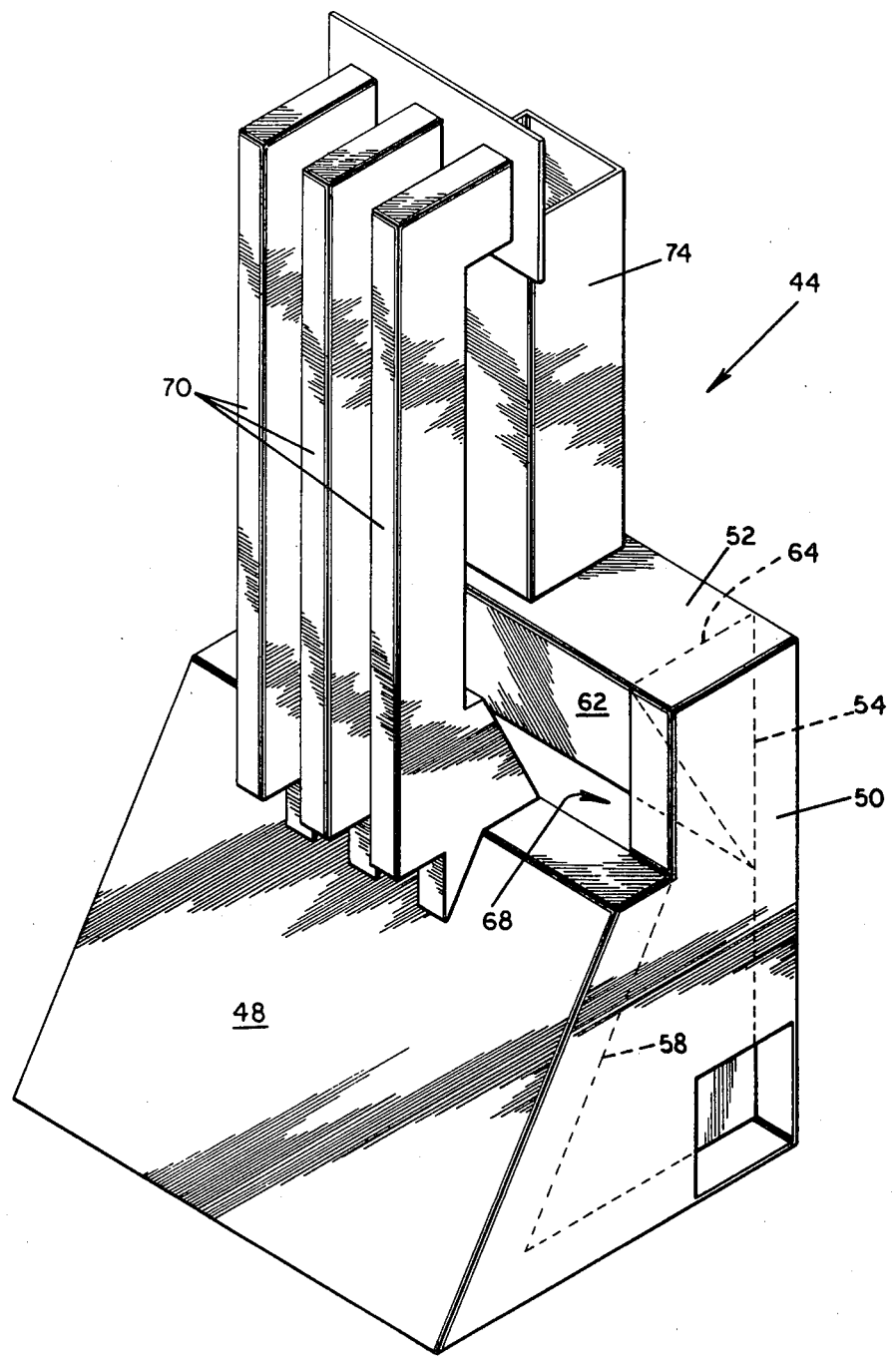
FIG. 3 is a detailed view of a rear section of the heat extraction unit shown in FIG. 1.

Referring now to the drawing in which like numbers indicate like elements, it will be seen that there is a fireplace 10 having a raised hearth 12. The fireplace 10 is designed to accomodate the burning of conventional fuels, such as wood and the like. The fireplace 10 is of a width and depth somewhat larger than conventional fireplaces so as to accomodate the burning of a greater amount of fuel at one time.

The lower portion of the side walls 14 and back wall 16 of the fireplace 10 is typically constructed of firebrick. The side walls 14 and back wall 16 thereby define a combustion chamber 17 of the fireplace 10. The front opening 18 of the fireplace 10 is equipped with glass doors 20 which prevent air from the adjacent room 22 from entering the fireplace 10 to fuel the fire therein while still permitting occupants of the room 22 to enjoy the aesthetic appeal of a roaring fire. The glass doors 18 are preferably of a hinged type which open to permit easy access to the fireplace for loading of fuel and closing to provide a relatively airtight seal.

Located beneath the hearth 12 is a conventional ash pit 24 having an opening 26 into the fireplace 10 to facilitate removal of ashes from the fireplace 10. A door 28 on the exterior wall 30 is also provided for convenient removal and disposal of the ashes from the ash pit 24.

Since the glass doors 20 effectively seal the fireplace 10, combustion air is introduced to the combustion chamber 17 through a pair of hollow pipes 32 which extend from the front of the combustion chamber through the exterior wall 30. The end of the pipes 32 adjacent the opening 18 of the fireplace 10 is provided with a foot 34 having numerous perforations 36 therein so as to permit air flowing through the pipes to emerge from the feet 34 and be directed in the general direction of the glass doors 20. In this manner, combustion air from the outside 36 may be introduced to the combustion chamber 17 to fuel the fire therein. It will also be appreciated that the air emerging from the feet 34 will tend to reduce the temperature of the air surrounding the glass doors 20 and thereby prevent damage or danger caused by the overheating of the glass doors. On the end of the pipes 32 opposite the feet 34 are caps 38 which are slidably actuated by levers 40 and which thereby functions as dampers. It will thus be appreciated that the combination of the pipes 32 and the feet 34 provides a permanent set of andirons for supporting logs in the fireplace 10.

To provide additional safety to the glass doors 20 from possible breakage from a falling log and the like, a log retaining bracket 42 is provided in the front opening 18 of the fireplace 10 between the feet 34 and the glass doors. The log retaining bracket 42 is of basically A-frame design and is maintained in a substantially vertical orientation during use by a clip (not shown) or the like which fastens the apex of the bracket to the fireplace 10.

Mounted on top of the back wall 16 and side walls 14 of the combustion chamber 17 is a heat extraction unit 44 which thereby defines a smoke chamber 45. The heat extraction unit is generally made of a material which will withstand the high temperatures generated by the burning fuel and which will also readily conduct heat. A heavy gauge metal, such as ¼" thick 285 grade C boiler plate, has been found to be a useful material for the construction of the heat extraction unit 44.

The heat extraction unit 44 is made of essentially a twin shell of metal to thereby provide an air space between the two shells. The outer shell is comprised of an outer front panel 46, an outer rear panel 48, two outer side panels 50 and an outer top panel 52. The inner shell is comprised of two inner side panels 54 spaced inwardly from the outer side panels 50 so as to provide a lateral heating chamber 56, 57 on either side of the smoke chamber 45; by an upper rear slant piece 58 spaced inwardly from the outer rear panel 48 so as to provide a rear heating chamber 60 which is generally box-like in shape and slanting from a vertical position slightly toward the front opening; and by an upper front slant piece 62 spaced inwardly from the outer front panel 46 and the outer top panel 52 so as to provide a front heating chamber 64 which is generally prismatic in shape. Thus, it will be appreciated that there are four distinct heating chambers 56,57,60,64; yet, each heating chamber commmunicates freely with another heating chamber to thereby provide a network of interconnected heating chambers which encircles the smoke chamber 45. The present invention therefore provides a large surface area exposed to the heated gases in the smoke chamber 45 and therefore provides a great degree of heat transfer to the air in the heating chambers 56,57,60,64 from the hot combustion gases which fill the smoke chamber.

A conventional chimney 66 communicates with the smoke chamber 45 through an opening 68 between the rear heating chamber 60 and the front heating chamber 64 to provide the proper "draw" for the fireplace 10 and to exhaust the combustion gases to the outside 36.

Extending upwardly from the rear heating chamber 60 are three rear vertical ducts 70. The rear vertical ducts 70 extend through at least a portion of the height of the interior of the chimney 66. It is preferable to use a plurality of ducts for the rear vertical ducts 70, rather than a single large duct, so that a greater surface area is exposed to the hot combustion gases flowing up the chimney 66. The present invention therefore permits heating of the air within both the rear heating chamber 60 and the rear vertical ducts 70. This thereby provides a greater opportunity for heat exchange between the hot combustion gases and the air flowing through the heat extraction unit 44.

The rear vertical ducts 70 terminate at a position a portion of the distance up the chimney 66 and join horizontal ducts 72 for distribution of heated air at positions horizontally removed from the fireplace 10. Although the present invention is illustrated as being used in a single story structure, it is specifically contemplated that additional vertical and horizontal duct work (not shown) may be provided to permit the use of the present invention in multi-story structures. Such duct work is well known in the art.

Extending upwardly from the front heating chamber 64 is a front vertical duct 74 which joins the horizontal ducts 72 located directly above it. The front vertical duct 74 therefore conducts heated air from the front heating chamber 64 to the horizontal ducts 72 for distribution at positions horizontally removed from the fireplace 10. In order to establish a flow of air through the horizontal ducts 72 a blower fan 76 is provided in the horizontal ducts.

In order to provide cold air return to the heat extraction unit 44, cold air return ducts 78 are provided on both sides of the raised hearth 12. The cold air return ducts 78 extend from the grates 80 to the lateral heating chambers 56. Although the heat extraction unit 44 and the rear vertical ducts 70 are constructed to be airtight so that combustion gases will not enter the system, it is desirable to maintain a slight positive air pressure in the heat extraction unit and the rear vertical ducts. Therefore, an additional blower fan 82 is provided in each cold air return duct 78 so that a slightly larger volume of air will be supplied to the heat extraction unit 44 than can be distributed through the horizontal ducts 72, thereby maintaining a slight positive pressure in the heating chambers 56,57,60,64 and the rear vertical ducts 70 to prevent combustion gases from the smoke chamber 45 and chimney 66 from being drawn into the heating system.

In normal periods of non-use, the glass doors 20 are kept closed to prevent air from the room 22 from going up the chimney 66 or air coming down the chimney and entering the room. In this manner the glass doors 20 function much the same way as a damper on a conventional fireplace. Also, during non-use the caps 38 should be kept closed over pipes 32 to prevent air from the outside 36 from entering the fireplace 10.

In order to use the fireplace of the present invention, the glass doors 20 are opened and the log retaining bracket 42 is removed by tilting the top of the bracket back away from the retaining clip (not shown). The bracket 42 may then be removed from the fireplace 10. A supply of firewood or similar combustable fuel is then loaded into the fireplace 10 and set on fire. The levers 40 are then actuated to remove the caps 38 from the end of the pipes 32 to provide a supply of air flowing out of the feet 34 sufficient to maintain efficient combustion of the burning firewood. The log retaining bracket 42 is then replaced in the fireplace 10 and the glass doors 20 are closed. This is the normal operating configuration for the present invention. Although it would be possible for the present invention to work with the glass doors 20 open and the caps 38 closed, the heating system would be far less efficient. Therefore, it is contemplated that the present invention be operated at all times will the glass doors 20 closed.

Once a fire is established, hot combustion gases will rise from the combustion chamber 17 into the smoke chamber 45 and contact the inner side panels 54 and slant pieces 58,62 and thereby transfer heat to air in the lateral heating chambers 56,57, the rear heating chamber 60 and the front heating chamber 64. The hot combustion gases then leave the heat extraction unit 44 through the opening 68 and continue up the chimney 66. It will also be appreciated that as the hot combustion gases leave the heat extraction unit 44 they also contact the outer surface of the rear vertical ducts 70 and thereby provide additional heating to the air within the rear vertical ducts.

It is specifically contemplated that the blower fans 76,82 may be actuated by a thermostat. Such thermostatic control systems are well known in the art. Therefore, when heat is required in the room 22, the thermostat will turn on the blower fans 76,82. Cold air from the room 22 will enter the cold air return ducts 78 and be forced into the lateral heating chambers 56,57 where it will undergo a degree of initial heating. Since both the lateral heating chambers 56,57 communicate with both the front heating chamber 64 and the rear heating chamber 60 a protion of the heated air in the lateral heating chambers will then be forced into the front heating chamber and a portion will be forced into the rear heating chamber. The portion of the heated air forced into the front heating chamber 64 will undergo an additional degree of heating and then be forced into the front vertical duct 74 and eventually into the horizontal ducts 72. The portion of the heated air forced into the rear heating chamber 60 undergoes an additional degree of heating and is forced into the rear vertical ducts 70 for even further heating, and is then forced into the horizontal ducts 72 where it is combined with the heated air from the front heating chamber 64 and is distributed to the room 22 and other points (not shown) with the aid of the blower fan 76. This network of heating chambers 56,57,60,64 in combination with the rear vertical ducts 70 provides an extended path of travel for the air flowing through the heat extraction unit 44 and thereby affords a great length of time for heat exchange to take place.

When the room 22 has reached the desired temperature, the thermostat will shut off the blower fans 76,82 whereupon no more heated air will be distributed to the room 22. When the firewood in the fireplace 10 has been completely burned, the ashes from the burned wood may be conveniently shoveled into the ash pit 24. When desired, additional firewood may be added to the fireplace 10 and burned if additional heating is needed.

Thus, it will be appreciated that the present invention provides an efficient central fireplace heating system which may be used to supplement or replace conventional furnace heating systems.

In an alternate embodiment (FIG. 4), it will be seen that the middle duct of the rear vertical ducts 70 has been replaced by a water tank 84. The water tank 84 is mounted on top of the ledge 86 of the heat extraction unit 44 and extends upwardly therefrom through at least a portion of the height of the interior of the chimney 66. Unlike the rear vertical ducts 70, however, the water tank 84 does not attach to the horizontal ducts 72, but rather terminates at its upper end within the chimney 66.

The water tank 84 is typically constructed of a material which is heat conductive and resistant to deterioration due to repeated exposure to high temperature. The interior of the water tank 84 is typically coated with a material which prevents rusting of the material of which the tank is constructed. This coating is similarly resistant to deterioration under high temperature conditions and exposure to water. Such materials and coatings are known in the art.

A pipe 88, which is connected to a pressurized source of cold water (not shown), is connected to the lower end of the water tank 84. A second pipe 90 connected to the upper end of the water tank 84 is connected to the input of a conventional water heater (not shown). It will thus be appreciated by those skilled in the art that the water contained in the water tank 84 will be heated by undergoing heat exchange with the hot combustion gases escaping up the chimney 66 in the same manner as the air in the rear vertical ducts 70 is heated. Additionally, by introducing cold water to the bottom of the tank 84 and removing the water from the top of the tank, cold water is introduced to the hottest portion of the tank, due to its proximity to the combustion chamber 17. Furthermore, mixing of the cold water from the pipe 88 and heated water in the tank is minimized by introducing the cold water to the lower portion of the tank 84. Therefore, the water removed from the top portion of the tank 84 through the pipe 90 is generally the warmest water in the tank. Those skilled in the art will therefore appreciate that the water tank 84 functions as a preheater for a conventional water heater (not shown) connected to the pipe 90, thereby reducing, or at times eliminating, the amount of fuel which a conventional water heater would otherwise use.

In yet another alternate embodiment (FIG. 5), it will be seen that an air space 92 is defined by the walls 14,16 of the combustion chamber 17 and a secondary wall 94 which surrounds the walls 14,16 of the combustion chamber 17. Cold air from the room 22 is supplied to the air space 92 through a pair of grates 96, mounted on the front of the hearth 12, and ducts 98 connecting the grates and the air space. Ducts 100 connect the air space 92 to the lateral heating chambers 56,57 through openings 102 in the outer side panels 50 of the heat extraction unit 44 adjacent the openings for the cold air return ducts 78.

It will thus be appreciated by those skilled in the art that radiant heat from burning fuel in the combustion chamber 17 heats the brick of the walls 14, 16 which in turn heats the air in the air space 92. As with the cold air return ducts 78, blower fans (not shown) may be used in the ducts 98.

In the normal operation of the fireplace as previously described above, the operation of the fireplace may be supplemented by forcing cold air drawn from the room 22 through the grates 96 and ducts 98 into the air space 92, whereupon the air therein undergoes a degree of heating. The heated air from the air space 92 is then forced through the ducts 100 into the lateral heating chambers 56,57 for further heating as has already been described herein. It will be appreciated that the air space 92 therefore provides heating of the air by radiant heat from burning fuel in the combustion chamber 17 which heat would otherwise not be efficiently utilized in a conventional fireplace.

Referring now particularly to FIG. 8, it will be seen that there is a solar heating system connected to the previously described fireplace heating system. The solar heating system includes a solar panel 104 mounted on the roof 106 of the building by legs 108. The solar panel 104 includes a solar radiation absorbing plate 110, such as a black anodized aluminum sheet or the like. Other radiation absorbing materials are known in the art and are suitable for use in the present invention.

Disposed above and spaced from the aborbing plate 110 is a solar radiation transmissive plate 112, such as a sheet of glass or the like. The transmissive plate 112 permits solar radiation to pass through the transmissive plate and be substantially absorbed by the absorbing plate. The transmissive plate 112 is spaced from the absorbing plate 110, defining a solar air heating chamber 114 therebetween. The chamber 114 is sized and shaped so that relatively large volumes of air can be circulated therethrough. It is contemplated that the dimensions of a chamber 114 suitable for the present invention can be approximately 1½ feet×3 feet×6 feet, although other dimensions are also useful.

Disposed below the absorbing plate 110 is a layer of insulation 116 which prevents the loss of heat from the absorbing plate through the bottom of the solar panel 104.

A pipe 118 has one end 120 connected to a pressurized source of water (not shown) and the other end connected to a water storage tank 122. The pipe 118 passes through the solar panel 104 in a straight, serpentine or other like manner well known in the art so as to provide sufficient contact with the absorbing plate 110. It will therefore be appreciated that the pipe 118 is in thermal communication with the absoring plate. It is intended that the pipe 118 be made of heat conductive material. It is also intended that those portions of the pipe 118 which are not within the solar panel 104 can be wrapped with insulation (not shown) to prevent heat loss therefrom. Thus, it will be appreciated that water which is passed through the pipe 118 is heated when it passes through the solar panel 104. It is specifically contemplated that a recirculating pump (not shown) can be used to continuously circulate water from the tank 122 through the solar panel 104. The piping for such a recirculating feature is within the skill of the art.

Connected at the lower end of the solar panel 104 and in communication with the chamber 114 is a vertical duct 124. The duct 124 is connected to and in communication with a horizontal duct 126 which in turn is connected to and in communication with a plenum 128. Extending vertically downward from the plenum 128 is a duct 130 which terminates at its lower end with a grate 132. Extending horizontally outward and thence vertically downward from the plenum 128 is a duct 134 which also terminates with a grate 136.

It will be appreciated by those skilled in the art that the ducts 124, 126, plenum 128 and ducts 130, 134 make up a cold air return system for the solar panel 112, the direction of the flow of air through the system being shown generally by the arrows, such as at 140. Extending vertically downward from the upper end of the solar panel 104 and in communication with the chamber 114 is a duct 142 which is connected at its lower end and in communication with the horizontal duct 72. Extending vertically downward from and in communication with the horizontal duct 72 is a duct 144 which terminates at its lower end with a grate 146.

In order to establish a flow of air through the cold air return system 124, 126, 128, 130, 134 through the chamber 114 and through the ducts 142, 72, 144, a blower fan 148 is provided in the duct 142. It is specifically contemplated that the blower fan 148 can be actuated by a thermostat or other suitable control apparatus. Such thermostatic control systems are well known in the art.

Hingably mounted in one end of the duct 72 is panel 149 which can be mechanically actuated to assume a closed position whereby the ducts 142, 72 are effectively sealed from communication with each other, and to assume an open position whereby ducts 142, 72 are in free communication. Hingably mounted in the other end of the duct 72 is a panel 150 which can be mechanically actuated to assume a closed position whereby duct 72 is effectively sealed from communication with the rear vertical ducts 70 and the front vertical duct 74 of the heat extraction unit 44. It is specifically contemplated that the panels 149, 150 can be actuated by electric motors (not shown) which can be controlled by switches, microprocessors, thermostats, a combination of the foregoing and the like. It is within the skill of the art to provide a microprocessor control system which can regulate the operation of the blower fans 76, 82, 148 the panels 149, 150 and the recirculation pump. Thus, it will be appreciated by those skilled in the art that the entire heating system, both solar and fireplace, can be centrally and automatically controlled.

Operation of the solar/fireplace heating system will now be considered. During daylight hours when the solar panel 104 is exposed to solar radiation, it is contemplated that heat for the building can be supplied exclusively by the solar panel. However, on extremely cold days or on cloudy days, it is contemplated that heat from the fireplace 10 can be used to supplement or replace that of the solar panel.

Initially, the panel 150 is closed so that the heat extraction unit is sealed off from the duct 72. Solar radiation passes through the transmissive panel 112 and is absorbed by the absorbing panel 110 which is heated thereby. The recirculating pump is operated continuously so that a flow of water through the pipe 118 and through the solar panel 104 is maintained. As the water passes through the portion of the pipe 118 in contact with the absorbing panel 110, it is heated slightly. The heated water from the pipe 118 is stored in the storage tank 122 which is preferrably insulated (not shown). The tank 122 can be connected to a conventional water heater (not shown), i.e., either electic, gas, oil, or the like, by a pipe 152 for ultimate connection to the plumbing system (not shown) for the building. In cold climates when freezing conditions are possible, it is contemplated that the recirculation pump can be run during periods when the solar panel 104 is not exposed to solar radiation so as to prevent freezing of the water in the pipe 118.

The blower fan 148 is turned on, preferably by a thermostat in the building indicating that additional heat is required. The panel 149 is opened so that ducts 142, 72 communicate freely. A flow of air throught the ducts 134, 130, the plenum 138, the ducts 126, 124, the chamber 114, the ducts 142, 72, 144 is established. As the air passes throught the chamber 114 it is warmed by the heat of the absorbing panel 110 over which it passes. The heated air is then distributed to portions of the building horizontally removed from the solar panel. Although the present invention is shown as having only one heat dispensing register 146, it is specifically contemplated that additional heat dispensing registers or grates may be utilized at other locations. Furthermore, it is also contemplated that more than one solar panel may be used depending on the size of the building to be heated.

During periods when the solar panel 104 is not exposed to solar radiation, such as at night, the fan 148 is not operated, the panel 149 is closed and the panel 150 is opened. A fire is built in the fireplace 10 and the fans 78, 86 are actuated. Air passing through the heat extraction unit 44 is heated as had been previously described and is distributed throughout the building by the ducts 72,144. Water in the tank 84 is also heated by the fire. The heated water in the tank 84 is supplied to the storage tank 122 through the pipe 90. As with the solar panel 104, the water in the storage tank 122 can be recirculated through the tank 84 so as to maintain the water in the storage tank at a relatively high temperature. It is specifically contemplated that the storage tank 122 should be positioned slightly above the level of the tank 84. With the use of an additional pipe (not shown) connecting the bottom of the storage tank 122 with the pipe 88, a thermosiphon effect can be obtained by the differential heating of the water in the tank 84 and the storage tank 122. In this manner, recirculation of the water is possible without the use of a recirculating pump.

During times when it is desirable to operate the solar heating system at the same time as the fireplace heating system, both panels 149,150 are opened and all the blower fans 76, 86, 148 are operated at the same time. The only precaution in the design of the heating system for such simultaneous operation is that the force of the air coming from the fan 76 must not be so great as to overpower the fan 148 and reverse the flow of the air through the chamber 114.

It should be understood, of course, that the foregoing relates only to preferred embodiments of the present invention and that numerous modifications or alterations may be made therein without departing from the spirit and scope of the invention as set forth in the appended claims.

I claim:
1. A heating system for a building comprising:
a solar panel mounted externally of said building, said solar panel comprising:
a solar radiation absorbing plate;
a solar radiation transmissive plate spaced from said absorbing plate to define a solar air heating chamber therebetween, said solar air heating chamber being sized and shaped to conduct air therethrough and to heat said air passing therethrough during periods when said solar panel is exposed to solar radiation, said solar air heating chmaber having an input and an output;
means for conducting air from inside said building to said input of said solar air heating chamber and for conducting heated air from said output of said solar panel to the inside of said building and for distributing said air to selected portions of said building;
means for forcing air through said conducting and distributing means and through said solar air heating chamber;
water heating means in heat transfer relation with said absorbing plate for conducting water therethrough to heat said water during periods when said solar panel is exposed to solar radiation; said means having an input and an output;
means for conducting water from a pressurized source to said input of said water heating means;
means for conducting water from said output of said water heating means to a storage tank;
a fireplace for burning fuel therein; said fireplace having an opening into a room of said building;
a chimney connected to said fireplace to provide an exhaust for gases of combustion from said fuel burned in said fireplace;
means for selectively providing air from outside said building to said fireplace;
means for selectively sealing said opening of said fireplace from communication with said room;
a heat extraction unit mounted within said fireplace, said unit comprising:
a first air chamber defining a sloping back wall of said fireplace;
a second air chamber defining a sloping upper front wall of said fireplace, such that said sloping back wall and said sloping upper front wall define an opening for passage of said hot gases of combustion from said fireplace to said chimney;
two side air chambers each defining a side wall of said fireplace, said side air chambers freely communicating with said first and second air chamber;
means for conducting air from said building to at least one of said side air chambers, whereby said air in said air chambers is heated by fuel burned in said fireplace;
means for conducting said heated air from said second air chamber to said means for distributing heated air;
means for conducting said heated air from said first air chamber vertically through at least a portion of said chimney, whereby said heated air in said means is further heated by said hot gases of combustion in said chimney, said means further conducting said heated air to said means for distributing heated air; and
means for selectively preventing communication between said means for distributing heated air and said heat extraction unit.
2. The heating system of claim 1 wherein said storage tank is a conventional water heater.
3. The heating system of claim 1, further comprising:
a bottom air chamber at least partially surrounding a portion of said fireplace below said sidde air chambers, said bottom air chamber freely communicating with said side air chambers; and
means for conducting air from said building to said bottom air chamber, whereby said air in said bottom air chamber is heated by fuel burned in said fireplace.
4. The heating system of claim 3, wherein said means for conducting heated air from said first air chamber further comprises tank means for containing water therein, said tank means extending vertically through at least a portion of said chimney, whereby water in said tank means is heated by said hot gases of combustion in said chimney, said heating system further comprising means for conducting heated water from said tank means to said storage tank.

* * * * *